US006390657B1

(12) United States Patent
Billot

(10) Patent No.: US 6,390,657 B1
(45) Date of Patent: May 21, 2002

(54) MOTOR VEHICLE HEADLIGHT EQUIPPED WITH A LAMP AND IMPROVED ELECTROMAGNETIC SHIELDING MEANS

(75) Inventor: Gérard Billot, Montfermeil (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 09/554,626

(22) PCT Filed: Aug. 25, 1999

(86) PCT No.: PCT/FR99/02039

§ 371 Date: May 17, 2000

§ 102(e) Date: May 17, 2000

(87) PCT Pub. No.: WO00/17570

PCT Pub. Date: Mar. 30, 2000

(30) Foreign Application Priority Data

Sep. 21, 1998 (FR) ........................................... 98 11837

(51) Int. Cl.[7] ................................................ B60Q 1/00

(52) U.S. Cl. ....................... 362/519; 362/538; 362/548; 362/265

(58) Field of Search ................................ 362/263, 265, 362/538, 519, 548, 267, 539

(56) References Cited

U.S. PATENT DOCUMENTS 5,434,763 A * 7/1995 Hege et al. ................. 362/265
5,879,073 A 3/1999 Hori et al. .................. 362/265
6,072,277 A * 6/2000 Yamamoto et al. ..... 362/267 X
6,176,604 B1 * 1/2001 Dubrovin et al. ........... 362/539

FOREIGN PATENT DOCUMENTS

DE 41 41 587 6/1993
DE 197 03 233 7/1997
DE 197 37 640 3/1998

* cited by examiner

*Primary Examiner*—Stephen Husar
(74) *Attorney, Agent, or Firm*—Morgan & Finnegan LLP

(57) ABSTRACT

A motor vehicle headlight includes a reflector on which a lamp holder is fixed for mounting a discharge lamp, and a high tension connector adapted to be engaged on the lamp mounted in the lamp holder to ensure the electrical power supply of the said lamp. The invention provides that the reflector has an electrically conductive layer, that the lamp holder has a metallic portion fixed on the reflector in such a way as to be in electrical contact with the said layer, that the connector has a metallic screening envelope, and that the said portion of the lamp holder and/or the connector has at least one elastically deformable conductive tongue for providing electrical continuity between the said portion of the lamp holder and the connector during fitting of the said connector. Applicable to the electromagnetic compatibility of headlights with discharge lamps.

10 Claims, 3 Drawing Sheets

MOTOR VEHICLE HEADLIGHT EQUIPPED WITH A LAMP AND IMPROVED ELECTROMAGNETIC SHIELDING MEANS

BACKGROUND OF THE INVENTION

The present invention relates in general terms to motor vehicle headlights equipped with a discharge lamp.

Discharge lamps, especially of the metal halide type (typically sodium iodide) are more and more frequently used as light sources in such headlights.

In this connection they display the appreciable advantage that, for a comparable power consumption, they are able to provide a much greater light intensity than in the case of conventional halogen filament lamps.

However, these lamps do have the disadvantage that in their arc they give rise to electromagnetic fields which pose a serious problem in regard to the requirements for electromagnetic compatibility, as to both emission and reception, which are generally imposed by regulations. In this connection it will be observed that these requirements are today becoming more and more severe through the development of electronic circuits which provide certain security functions on board a vehicle.

While there do indeed exist arrangements for screening as much as possible a discharge lamp and its power supply circuits, such arrangements are generally incompatible with the specific environment of a motor vehicle headlight. Thus for example, it is impossible to place the whole of the headlight within a Faraday cage by which it is completely surrounded, because it is necessary to leave free the region for exit of light in the, region of the cover glass.

BRIEF SUMMARY OF THE INVENTION

The present invention aims to overcome these limitations in the state of the art, and to propose a motor vehicle headlight which has a discharge lamp and improved screening means, in particular for the arc of the lamp, which are simple to construct and apply.

Another object of the invention is to ensure, without any particular intervention, electrical continuity between a screen of a high tension connector for a discharge lamp and other screening components of the headlight, once the connector has been fitted in place.

To this end, the invention proposes a motor vehicle headlight, comprising a reflector on which there is fixed a lamp holder for holding a discharge lamp, and a high tension connector adapted to be engaged on the lamp which is mounted in the lamp holder to provide electrical power to the said lamp, characterised in that the reflector has an electrically conductive layer, in that the lamp holder has a metallic portion fixed on the reflector in such a way as to be in electrical contact with the said layer, in that the connector has a metallic screening envelope, and in that the said portion of the lamp holder and/or the connector has at least one elastically deformable conductive tongue for providing electrical continuity between the said portion of the lamp holder and the connector during fitting of the said connector.

Aspects, which are preferred but not limiting, of the headlight in accordance with the invention are as follows:

A plurality of resilient tongues are provided.

The or each resilient tongue is part of the lamp holder.

The or each resilient tongue is formed integrally with the said portion of the lamp holder.

The or each resilient tongue has, in its free end region, a profile which defines a portion projecting towards the connector and the lamp holder respectively.

The said profile is a V-shaped profile.

The or each resilient tongue extends substantially parallel to the direction of fitting of the connector.

The or each resilient tongue extends substantially radially inwards from a crown which is part of the lamp holder, and within which the said high tension connector is adapted to be engaged.

The said conductive layer of the reflector is applied on a back face of the reflector, and with electrical continuity on a surface of the reflector adapted for mounting of the said crown thereon.

The said conductive layer of the reflector consists of the reflector itself, which is formed from metallic plate.

BRIEF DESCRIPTION OF THE DRAWINGS

Further features, objects and advantages of the present invention will appear more clearly on a reading of the following detailed description of preferred embodiments of the latter, which is given by way of non-limiting example and with reference to the attached drawing, in which.

DETAILED DESCRIPTION OF THE INVENTION

Figure 1:
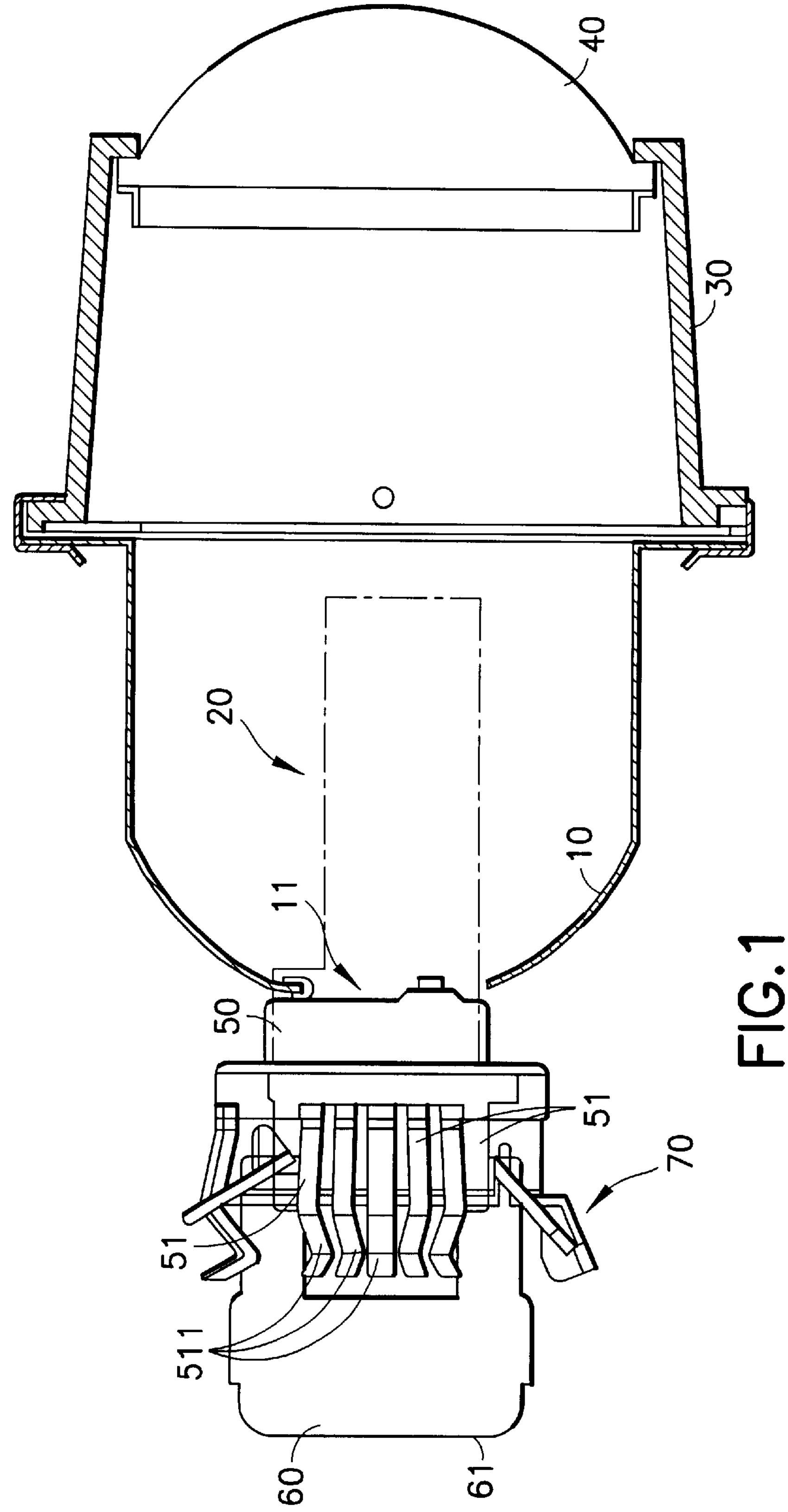
FIG. 1 is a diagrammatic view in vertical axial cross section of part of a headlight in a first embodiment of the invention.

With reference first to FIG. 1, this shows a motor vehicle headlight of the elliptical type which includes, in the conventional way, a casing closed at the front by a glass and defining an internal space. In the interests of simplification, these elements have not been shown in the drawings.

A reflector 10 of the elliptical type is mounted in the internal space of the casing, with a discharge lamp 20 mounted in the region of the first focus of the reflector.

A planar-convex lens 40 is placed in front of the reflector 10, in an accurately determined geometrical relationship, and is connected to the reflector by means of an intermediate member 30.

In order to ensure good geometrical stability in the presence of the high temperatures generated by the lamp when lit, the reflector 10 is made of metal plate, press-formed in the manner which is conventional per se, and it is therefore an electrical conductor.

A lamp holder 50, which is also made of a conductive material, is mounted in the region of the base of the reflector, This lamp holder is preferably seamed on the edge of the lamp hole 11 in the reflector 10, by means of lugs 52, one of which can be seen in FIG. 1, in such a way as to ensure electrical continuity between the reflector 10 and the lamp holder 50.

The lamp 20 is supplied with power in the manner known per se, through a high tension connector 60 which is attached removably to the back of the lamp holder 50.

This connector has a screened outer envelope 61 which is for example made from conductive metal plate.

Male and female connection elements (not shown), suitably insulated, provide the coupling between the connector 60 and the lamp 20 fitted in the lamp holder.

In order to ensure electrical continuity between the lamp holder 50 and the high tension connector 60, the lamp holder has a plurality of elastically deformable metal tongues or claws 51 which extend backwards from the lamp holder and which are arranged to extend along, and in contact with, the envelope of the connector 60. In the present example there are five of these tongues 51, which have, in the region of their free rear ends 511, a generally V-shaped profile, the apex of which is directed towards the envelope of the connector 60. The position of these tongues when at rest is such that, when the connector 60 is fitted in position, its envelope urges the tongues outwards in such a way that the elastic return force thereby produced acts in its turn on the ends 511 of the tongues so that they remain in reliable contact with the envelope of the connector 60.

In this way, satisfactory electrical continuity is obtained between the high tension connector 60, the lamp holder 50, the reflector 10 and, where appropriate, the intermediate member 30, so that high quality screening is obtained against electromagnetic emissions liable to perturb the lamp 20.

Finally, the reference 70 designates means, which are known per se, for locking the connector 60 on the lamp holder 50.

It will be noted here that the tongues 51 may be made integral with the lamp holder 50, or they may be attached on the latter and fixed for example by seaming.

It will also be noted that it is possible to provide further tongues 51 on the other side of the lamp holder.

The headlight may also include a screen for direct light, made from metal plate and placed in front of the lamp 20 within the reflector 10.

Preferably, this mask (not shown) is connected electrically to the lamp holder, thus advantageously completing the screening effect given by the other components.

Figure 2:
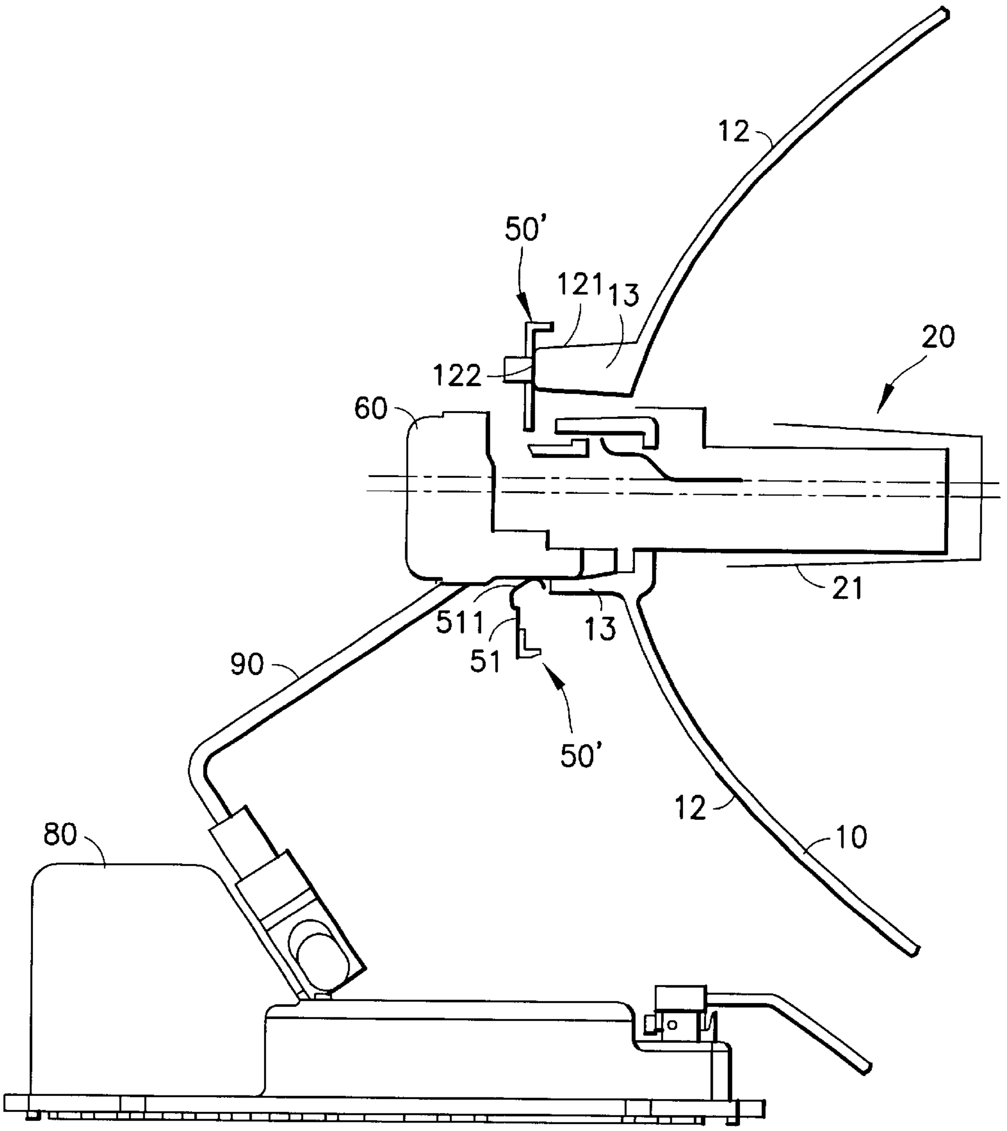
FIG. 2 is a diagrammatic view in vertical axial cross section of part of a headlight in a second embodiment of the invention.
Figure 3:
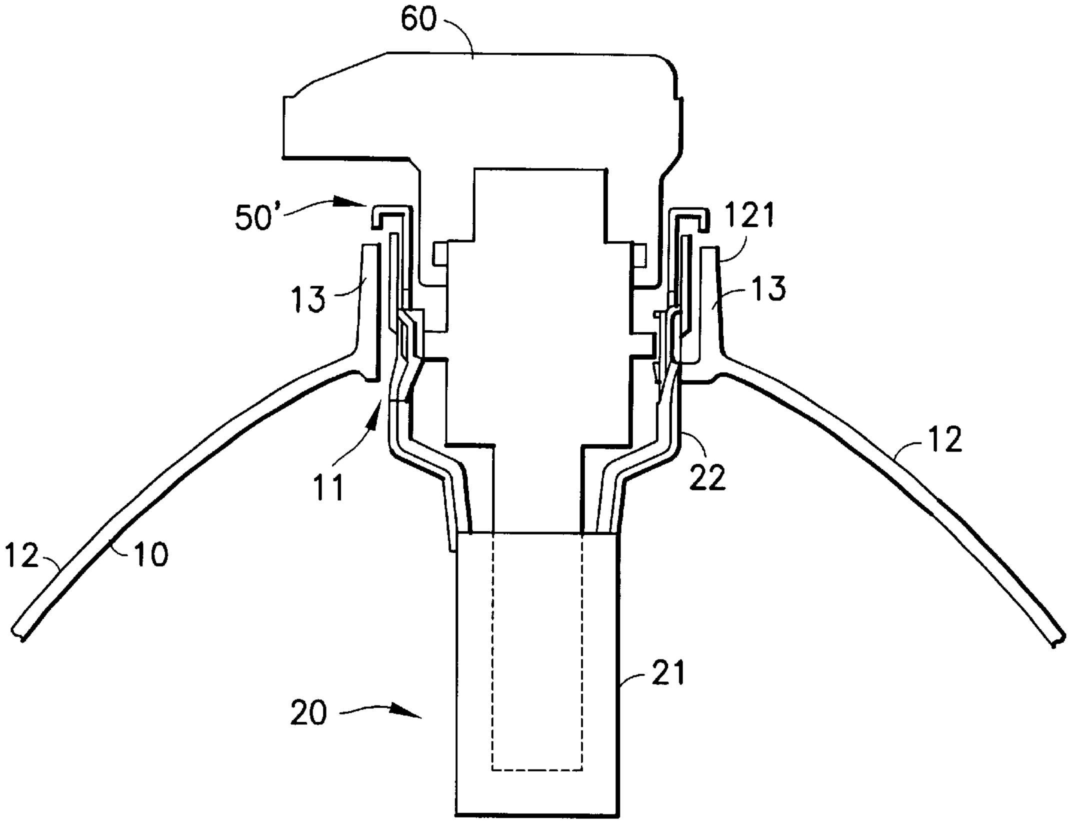
FIG. 3 is a diagrammatic view in vertical horizontal cross section of the part of the headlight shown in FIG. 2.

Reference is now made to FIGS. 2 and 3, in which another embodiment of the invention is shown, which is applicable in particular to headlights in which the reflector is formed by injection of thermosetting material (headlights of the parabolic type, or having reflective surfaces which themselves generate at least part of the photometry of the beam).

In order to complete the screening of the discharge lamp 20, the reflector 10 has on its back face an electrically conductive layer 12 which is made for example by in situ moulding of the material of the reflector on or around a thin metallic insert, or again by physical or chemical deposition of an electrically conductive coating.

In that case, the discharge lamp 20 is fixed on the reflector with the aid of a crown which is made at least partly of metal, and which is generally designated by the reference 50', mounted on the annular posterior end of a collar portion 13 surrounding the lamp hole 11.

In order to give electrical continuity between the screening layer 12 and the crown 50', the said layer 12 is extended at 121 in the region of at least part of the outer face of the collar portion 13 of the reflector, and then at 122 in the region of at least part of the annular end face of the same collar portion.

The crown 50', being placed on and secured, for example by screw fastening, to the said annular end face, is thus in electrical continuity with the said layer 12.

In a manner similar to the embodiment in FIG. 1, continuity of the screening with the high tension connector 60 is obtained by means of a set of metal claws 51 which in this example extend essentially radially inwards from the crown 50'.

These claws have free end regions which are generally in the form of a V, the apex of which engages against the envelope of the connector 60.

It will also be observed that the metal mask 21 for the lamp 20, which also plays a part in the capture of parasitic electromagnetic radiation, is electrically connected to the crown 50' through at least one lug 22, which is preferably formed integrally with the mask and which passes along the lamp within the lamp hole 11.

Finally, FIG. 2 illustrates the housing 80 which encloses the ballast circuit for the discharge lamp 20, and which is connected to the high tension connector 60 through a screened cable 90.

Thus, in this configuration too, continuity of screening between the connector 60, the crown 50' by which the lamp is mounted, the conductive layer 12 of the reflector, and the mask 21, is obtained.

The present invention is of course in no way limited to the embodiments described and shown, but the person in this technical field will be able to apply to it any variation or modification within the spirit of the invention.

What is claimed is:

1. A motor vehicle headlight, comprising a reflector; a lamp holder; and a high tension connector configured to be engaged on the lamp which is mounted in the lamp holder to provide electrical power to the said lamp, wherein the reflector has an electrically conductive layer on the outer surface of said reflector, and wherein the lamp holder has a metallic portion fixed on the reflector in such a way as to be in electrical contact with said layer, the connector having a metallic screening envelope, said metallic portion of the lamp holder and the connector having and at least one elastically deformable resilient conductive tongue vertically spanning from said metallic portion of the lamp holder to said connector, for providing electrical continuity between said metallic portion of the lamp holder and the connector during fitting of said connector.

2. A headlight according to claim 1, wherein said conductive tongue may comprises a plurality of resilient tongues.

3. A headlight according to claim 1, wherein each resilient conductive tongue is fixed to the lamp holder.

4. A headlight according to claim 3, wherein each resilient conductive tongue is formed integrally with the said portion of the lamp holder.

5. A headlight according to claim 1, wherein each resilient conductive tongue has, in a free end region, a profile which defines a portion projecting towards the connector and the lamp holder respectively.

6. A headlight according to claim 5, wherein said profile is a V-shaped profile.

7. A headlight according to claim 1, wherein each resilient conductive tongue extends substantially parallel to the direction of fitting of the connector.

8. A headlight according to claim 1, wherein each resilient conductive tongue extends substantially radially inwards from a crown which is part of the lamp holder, and within which said high tension connector is configured to be engaged.

9. A headlight according to claim 8, wherein said conductive layer-applied to the outer surface of said reflector and with electrical continuity on said outer surface of said reflector configured for mounting of said crown thereon.

10. A headlight according to claim 1, wherein said conductive layer of the reflector consists of the reflector itself, which is formed from metallic plate.

* * * * *